United States Patent Office 3,134,751
Patented May 26, 1964

3,134,751
POLYSTYRENE LIGHT-STABILIZED WITH 2,6-DI-TERTIARY BUTYL-p-ALKYL PHENOL
Leo Costello, South Bound Brook, N.J., assignor to American Cyanamid Company, New York, N.Y., a corporation of Maine
No Drawing. Filed Dec. 21, 1961, Ser. No. 161,258
4 Claims. (Cl. 260—45.95)

The present invention relates to protecting polymeric styrene compositions against development of excess coloration, particularly against the deleterious effect of ultraviolet light. More particularly, it is concerned with a unique protective method for such compositions which method comprises dissemination therethrough of a controlled amount of a suitable tri-alkyl phenol.

Polystyrene, probably due to its structure, has a marked tendency to develop yellow coloration on continued exposure to light. Of the many industrially-available polymeric materials, it has proved one of the most difficult to adequately protect against the excessive development of such discoloration, particularly that caused by ultraviolet radiation.

The protective method of the present invention is particularly well suited for this purpose. Therefore, for purposes of this discussion, polystyrene will be taken as illustrative. Accordingly, also, the invention still further contemplates polystyrene so-protected by the addition of the tri-alkyl phenol.

Still more specifically, the phenol derivatives used as protective agents in this invention may be represented by the type formula:

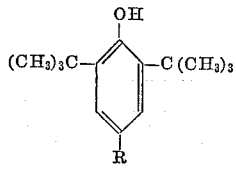

(I)

wherein R is an alkyl radical of from one to about four carbon atoms. These compounds are not new per se and have been previously known as antioxidants for oils and rubber.

Polystyrene, a homopolymer which may contain small quantities of lubricants and/or colorants, has been found useful in a wide variety of applications. In many of them the development of excessive yellow discoloration is undesirable. Therefore, many attempts have been made to protect polystyrene against this effect of exposure to radiation in the ultraviolet range (hereinafter abbreviated as "UV," as in UV-radiation and the like).

Primarily, this has been attempted by incorporating therein small amounts of various known UV-absorbing compounds. Such attempts have been only partially successful. Upon continued exposure, yellowing continues to take place at an objectionably high rate. There still remains a definite need for a method of so retarding this effect that, even after prolonged exposure, such yellow-discoloration is minimized.

Duration of protection can be extended somewhat by using larger amounts of the UV-absorber. However, this is not a generally satisfactory solution to the problem for several reasons. Such attempts soon encounter certain inherent limitations. For example, many known UV-absorbers produce per se an initial yellowing effect on being added to polystyrene. There is, therefore, a definite limit on the amount which can be added before further addition thereof offsets any additional benefit of increased protection. Other known UV-absorbers seem to offer good protection during initial exposure. However, when present in useful amounts they tend to break down and thereafter seemingly produce an accelerated rate of discoloration.

A major object of this invention, therefore, is the retardation of yellow discoloration due to exposure to UV light and production of the resultant protected composition. As noted above, this has been accomplished by the use of one of a specific few tri-alkyl phenols. This is particularly surprising in view of the fact that these few previously-known antioxidants function here as light stabilizers although they do not absorb UV light and have no previously known protective value as UV-absorbers.

For various reasons, antioxidants are not normally found as constituents of polystyrene compositions, prior to the present invention. There are perhaps some minor exceptions. For instance, they may be found in small amounts in modified polystyrenes of the type generally referred to as "high impact" polystyrene. These, however, are outside the present invention being radically different products containing rubber. In some cases these may contain an antioxidant to protect the rubber content. In some instances, also, to prevent premature polymerization, trace amounts of an antioxidant may be employed as a stabilizer for the monomer. After polymerization of so-stabilized monomers their presence is substantially undetectable. Neither use would appear to explain or even suggest their beneficial value when used in the present invention.

Further description requires some method of measuring and describing the extent of discoloration. Accordingly, in this discussion the effect will be discussed in terms of the "yellow index" (hereinafter denoted as "Y.I."). This Y.I. is a measure of degree of yellowness obtained by substituting data measured by a spectrophotometer in the following formula:

$$Y.I. = 100\left(\frac{T'_{680} - T'_{420}}{T_{560}}\right)$$

Wherein, "T" is the percent transmission of the unexposed sample at the indicated wavelength and "T'" that of the exposed sample at the indicated wavelengths.

Based thereon, the following test procedure was developed. To 100 parts of polystyrene the protective material to be tested is added on a two-roll mill. One roll is maintained at about 350° F., the other at 250° F. The mix is blended continuously over a ten-minute period by repeatedly passing the mix through the nip of the rolls for 70 passes. Samples of the resultant blended mix are compression molded into a 0.050" x 2" x 2" chip. Y.I. readings are taken before and after each designated exposure period in the Fade-Ometer and the Y.I. is calculated according to the above-noted formula. This procedure is used in the following discussion and specific examples and in obtaining the Y.I. values noted.

It is also necessary to establish a definition of successful protection. In general, when the Y.I. exceeds a value of some 15–20 units, the resulting polystyrene is too yellow and is considered unsatisfactory for many applications. A good result, which it is a principal object of the invention to attain, is to so protect the polystyrene that maximum exposure periods are required before the Y.I. readings reach this range.

To show the ability of the compounds of the present invention, to produce the desired protection, the following example, Example 1, was carried out. Therein and in all the subsequent illustrative examples all parts and percentages are by weight and all temperatures are in degrees Fahrenheit unless otherwise noted.

Because of their long chemical names, a number of compounds tested as protective agents in the examples are designated by numbers to simplify the reference thereto. These numbers designate the compounds indicated in the following listing:

| Agent No. | Chemical Name |
|---|---|
| A-1 | 2,6-di-t-butyl-p-cresol. |
| A-2 | 2,4,6-tri-t-butyl phenol. |
| A-3 | 2,2',methylent-bis(4-methyl-6-t-butyl phenol). |
| A-4 | 2,6-bis(2'-hydroxy-3'-t-butyl-5'-methyl-benzyl)-p-cresol. |
| A-5 | 4,4'-thiobis(3-methyl-6-t-butyl phenol). |
| A-6 | 4,4'-methylenebis(2,6-di-t-butyl phenol). |
| A-7 | 2,6-di-t-butyl phenol. |

The same identification number refers to the same compound whenever it occurs in the following examples.

EXAMPLE 1

Using the test procedure noted above, 100-part samples of commercial polystyrene are mixed with 0.1 part of the indicated antioxidant and the initial Y.I. determined. Exposure time is measured in hours of exposure in the Fade-Ometer required to reach the indicated Y.I. values. Illustrative average results are shown in the following table.

Table I

| Agent No. | Y.I. (Initial) | Exposure Hours to Y.I. of— | | |
|---|---|---|---|---|
| | | 10 | 15 | 20 |
| None (control) | 4 | 200 | 350 | 520 |
| A-1 | 2 | 510 | 770 | 825 |
| A-2 | 3 | 650 | 825 | 955 |

An extraordinary feature of the present invention is that the protective agent content appears to remain substantially constant and protection continues over extended periods of time. This is contra to their normal behavior when previously used as antioxidants to protect oils, fats, rubber and the like. In such cases, successful usage depends upon their being selectively oxidized. As a result, they are used up and the residual antioxidant content progressively diminishes.

Another surprising feature of the present invention is the discovery that they must be used in correct amounts. For example, as compared with amounts required in conventional usage as antioxidants, the correct amount required herein is relatively small. Moreover, and a quite unexpected feature is the discovery that increased duration of protection does not necessarily follow from addition of increased amounts of agent. This is shown in the following example.

EXAMPLE 2

Using the previously outlined procedure, Example 1 is repeated on another polystyrene sample using agent A-1 in varied amounts. Illustrative results are shown in the following table which shows the number of hours required to reach Y.I. values of fifteen and twenty units.

Table II

| Agent A-1 Amount (Wt. %) | Exposure Hours | |
|---|---|---|
| None | 350 | 520 |
| 0.02 | 430 | 530 |
| 0.05 | 570 | 750 |
| 0.10 | 720 | 875 |
| 0.25 | 740 | 890 |
| 0.5 | 755 | 970 |
| 1.0 | 400 | 800 |
| 1.5 | 360 | 650 |
| 2.0 | 315 | 500 |

From these results, which are typical of the agents tested, and others, it was found that less than about 0.01% is not particularly useful. Depending upon the particular agent, the beneficial effect passes a maximum somewhere between about 0.02 and about 1.0%. Above about 1.5–1.75% the protection obtained is no better and may be less than when no agent is present. The optimum range appears to be from about 0.05 to about 0.5% and the potentially useful range from about 0.01 to about 1.2%.

Moreover, this unexpected finding that beneficial results are obtained by using a compound previously known as an antioxidant as the protective agent in the compositions of the present invention is quite unique. According to the present invention, the solution to the problem does not involve merely making use of a known antioxidant. Other commercially-available antioxidants, which have been previously used for similar antioxidant purposes, are not satisfactory. This is shown in the following example.

EXAMPLE 3

Example 1 is repeated substituting 0.1 part of other well-known commercial antioxidants per 100 parts of polystyrene for those of Example 1. Illustrative results are shown in the following table.

Table III

| Agent Number | Initial Y.I. | Exposure Hours (Y.I.=) | |
|---|---|---|---|
| | | 15 | 20 |
| None (control) [1] | 5 | 350 | 520 |
| A-1 [1] | 2 | 720 | 875 |
| A-3 | | 280 | 410 |
| A-4 | | 280 | 400 |
| A-5 | | 290 | 380 |
| A-6 [2] | >20 | | |
| A-7 [2] | >20 | | |

[1] Repeated from Table II for comparison.
[2] Not further tested due to high initial Y.I.

Whatever may be the explanation of the behavior of the protective compounds of the present invention, not all previously-known antioxidants are suitable for the present purposes. Moreover, the surprising specificity of the invention is clearly shown by comparing the results obtained using A-1 (2,6-di-t-butyl-p-cresol) with the fact that the structurally closely analogous 2,6-di-t-butyl phenol (A-7) proved to have no utility whatever in the present invention.

*Example 4*

Example 1 is repeated, substituting as the protective agent equal weights of 2,6-di-t-butyl-4-ethyl phenol and of 2,6-di-t-butyl-4-propyl phenol. Substantially equivalent results are obtained to those obtained with A-1 and A-2.

I claim:

1. A composition of matter consisting essentially of styrene homopolymer and about 0.01 to about 1.2 weight percent of a compound of the formula:

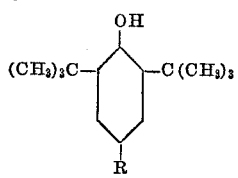

wherein R is an alkyl radical having one to four carbon atoms.

2. The composition of claim 1 wherein the compound is present in a concentration of about 0.05 to about 0.5 weight percent.

3. The composition of claim 1 wherein the compound is 2,6-di-t-butyl-p-cresol.

4. The composition of claim 1 wherein the compound is 2,4,6-tri-t-butyl phenol.

References Cited in the file of this patent
UNITED STATES PATENTS

| | | |
|---|---|---|
| 2,804,444 | Segro et al. | Aug. 27, 1957 |
| 2,864,802 | Price et al. | Dec. 16, 1958 |
| 2,957,833 | Baum | Oct. 25, 1960 |
| 2,994,681 | Hammon et al. | Aug. 1, 1961 |
| 2,999,841 | Csendes | Sept. 12, 1961 |
| 3,039,993 | Friedman | June 19, 1962 |